United States Patent [19]
Thomas et al.

[11] Patent Number: 6,148,336
[45] Date of Patent: Nov. 14, 2000

[54] ORDERING OF MULTIPLE PLUGIN APPLICATIONS USING EXTENSIBLE LAYERED SERVICE PROVIDER WITH NETWORK TRAFFIC FILTERING

[75] Inventors: Christopher N. Thomas, Soquel; Steven J. Jackowski, Santa Cruz; Keven J. Brock, Los Gatos, all of Calif.

[73] Assignee: Deterministic Networks, Inc., Santa Cruz, Calif.

[21] Appl. No.: 09/042,306

[22] Filed: Mar. 13, 1998

[51] Int. Cl.$^7$ .................................................. G06F 15/173
[52] U.S. Cl. ........................................... 709/224; 709/223
[58] Field of Search ........................................... 709/224, 226, 709/230, 223, 201, 203; 713/200, 201; 345/435; 364/514; 714/4

[56] References Cited

U.S. PATENT DOCUMENTS

| | | | |
|---|---|---|---|
| 5,136,581 | 8/1992 | Muehrcke | 370/62 |
| 5,341,477 | 8/1994 | Pitkin et al. | 395/200 |
| 5,596,720 | 1/1997 | Hamada et al. | 395/200.03 |
| 5,621,734 | 4/1997 | Mann et al. | 370/94.1 |
| 5,644,715 | 7/1997 | Baugher | 395/200.04 |
| 5,668,998 | 9/1997 | Mason et al. | 395/701 |
| 5,673,322 | 9/1997 | Pepe et al. | 380/49 |
| 5,674,003 | 10/1997 | Andersen et al. | 364/514 |
| 5,682,478 | 10/1997 | Watson et al. | 395/200.12 |
| 5,682,482 | 10/1997 | Burt et al. | 395/242 |
| 5,694,548 | 12/1997 | Baugher et al. | 395/200.12 |
| 5,701,484 | 12/1997 | Artsy | 395/683 |
| 5,880,740 | 3/1999 | Halliday et al. | 345/435 |
| 5,974,549 | 10/1999 | Golan | 713/200 |
| 5,987,611 | 11/1999 | Freund | 713/201 |

*Primary Examiner*—Mehmet B. Geckil
*Attorney, Agent, or Firm*—Stuart T. Auvinen

[57] ABSTRACT

Low-level network services are provided by network-service-provider plugins. These plugins are controlled by an extensible service provider that is layered above the TCP layer but below the Winsock-2 library and API. The extensible service provider orders the plugins based on the function performed by each plugin and on ordering hints. Plugins that redirect the protocol or socket are executed first. Plugins that examine packets or block entire packets are executed before plugins that modify packets. Plugins that compress or encrypt data are executed last for outgoing packets. Ordering hints cause a plugin to be executed before or after others in its functional class. Ordering allows examining plugins that simply read data get to the packets before an encrypting or compressing plugin renders the data unreadable. The extensible service provider has a plugin manager that orders and controls execution of the plugins. A filter manager evaluates one or more packet-filters. Filters are bound to plugins by binding objects; each socket has its own binding list of filters and plugins. Execution of some plugins can be skipped when filters bound to them do not match packets sent or received. Well-ordered plugins transparently provide a variety of network services such as content-filtering and blocking, encryption and compression, and statistics-gathering.

22 Claims, 10 Drawing Sheets

PRIOR ART

FIG. 4

PRIOR ART

FIG. 5

PRIOR ART

| RE-DIRECTOR CLASS | ATTACHED FILTER CLASS | FCN CLASS | ORDERING HINTS |
|---|---|---|---|
| PROTOCOL REDIRECT<br><br>SOCKET REDIRECT | PRE-PROCESS<br><br>APP NAME<br><br>APP LAYER<br><br>TRANSPORT LAYER<br><br>NETWORK LAYER<br><br>POST-PROCESS | EXAMINER<br><br>BLOCKER<br><br>MODIFIER<br><br>COMPRESSOR<br><br>ENCRYPTOR | ABSOLUTE FIRST<br><br>FIRST IN CLASS<br><br>LAST IN CLASS<br><br>ABSOLUTE LAST |

PRIORITY ←

WIN/95 REGISTRY

KEY: LAYERED_PROVIDER\PLUGINS\PLUGIN_A      90

NAME = PLUGIN A
   ENABLED = 1
   INSTALL_PATH = C:\WINDOWS\PLUGINA.DLL

• • •

KEY: LAYERED_PROVIDER\FILTERS\FILTER_A      92

NAME = FILTER A
   MODULE_NAME = "NETSCAPE.EXE"
   ADDRESS_FAMILY = 2
   DIRECTION = "BOTH"

• • •

KEY: LAYERED_PROVIDER\PLUGINS\PLUGIN_A\ATTACHED_FILTERS\FILTER_A

ENABLED = 1

KEY: LAYERED_PROVIDER\PLUGINS\PLUGIN_A\ATTACHED_FILTERS\FILTER_D

ENABLED = 1

ORDERING OF MULTIPLE PLUGIN APPLICATIONS USING EXTENSIBLE LAYERED SERVICE PROVIDER WITH NETWORK TRAFFIC FILTERING

FIELD OF THE INVENTION

This invention relates to software for computer networks, and more particularly to layered network service providers.

BACKGROUND OF THE INVENTION

The personal computer revolution is being spearheaded by computer networks and especially the Internet. Communications began with text-only e-mail and file-transfer protocols (FTP), but browsing became commonplace with improved user interfaces and graphics. Mission-critical business transactions, corporate database queries, and even video conferencing and voice telephone calls all use the Internet.

Not surprisingly, the Internet and local networks are becoming crowded. Simply increasing bandwidth is expensive and often only shifts bottlenecks to another part of the network. While users may not notice delayed e-mail, Internet browsing can become painfully slow during times of network congestion. Video conferencing and telephony suffer poor quality and even gaps of lost speech when the network is slow.

Figure 1:
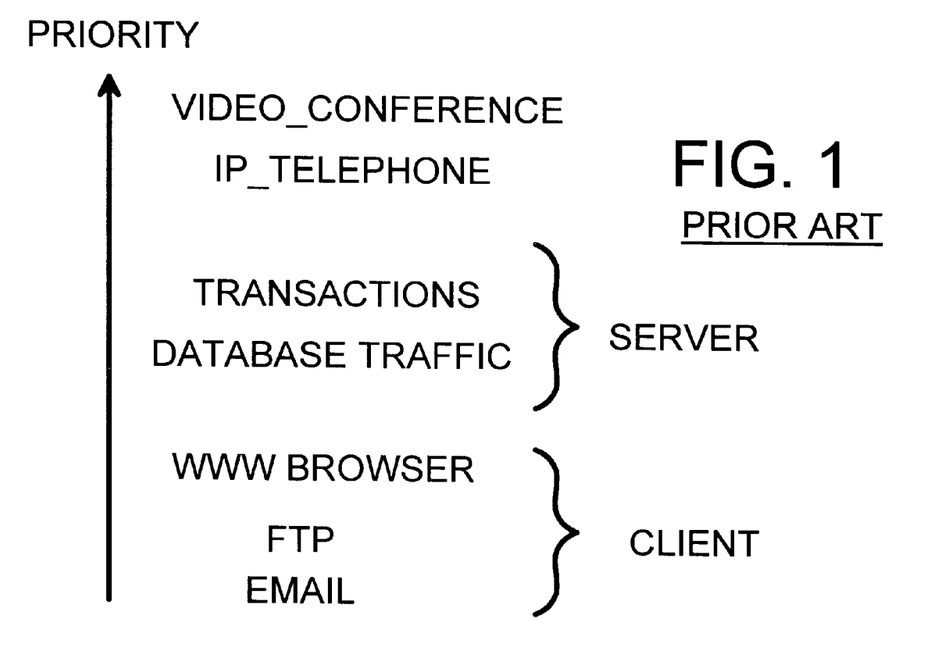
FIG. 1 illustrates differing priorities of various kinds of network traffic.

FIG. 1 illustrates differing priorities of various kinds of network traffic. Two-way video and audio communications such as video conferencing and Internet telephony must have their packets delivered over the network in real time, or parts of the conversation are lost. Thus these services have the highest priority in most networks.

Business-critical applications such as financial transactions and accesses of corporate databases have moderately high priority. Browser traffic to the world-wide-web has a lower priority since much of this traffic is for information gathering and personal uses. However, browser traffic should not be so slow as to irritate the users. Lowest in priority are file transfers and e-mail, since these are usually not needed immediately.

Server traffic tends to have a higher priority than client traffic, since business-critical applications reside on corporate servers. Clients are usually individual desktop PC's.

Attempts have been made to improve transmission speed of higher-priority traffic. Bandwidth-shaping or traffic-shaping delays low-priority traffic so that higher-priority packets can pass through with less delay. Quality-of-Service (QOS) is thus improved. Bandwidth can be reserved for the highest-priority applications such as video conferencing. See for example, U.S. Pat. Nos. 5,644,715 and 5,694,548, by Baugher et al., assigned to IBM; also U.S. Pat. No. 5,673,322 by Pepe et al., and U.S. Pat. No. 5,136,581 by Muehrchke, assigned to Bell Labs.

Figure 2:
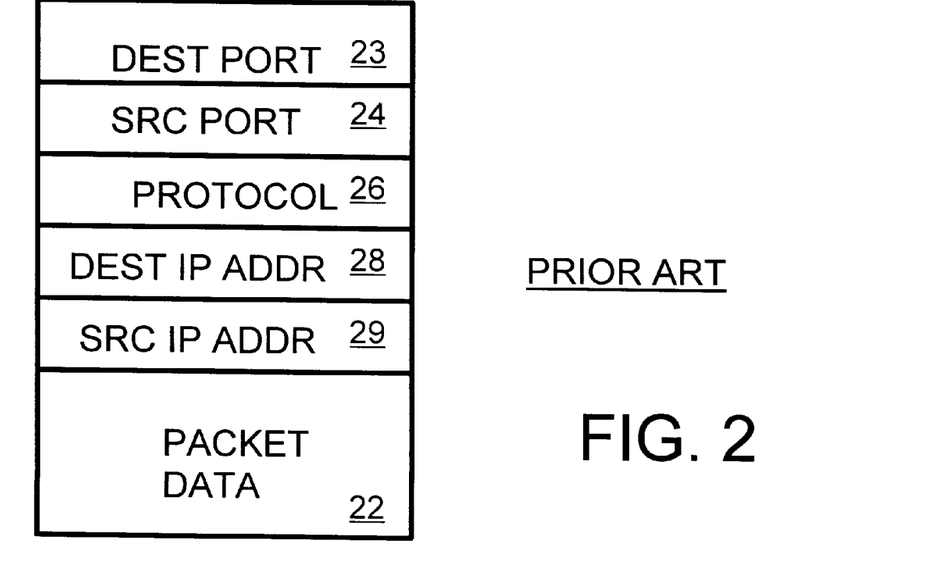
FIG. 2 shows an Internet packet.

Can't Determine Priority of IP Packets—FIG. 2

Ideally, a network device such as a router would read a packet's header and determine the priority of that packet from fields in the header. Unfortunately, determining the priority of packets passing through a network point is problematic. Filtering software can be used to identify packets using certain network protocols such as TCP, or certain Internet Protocol (IP) addresses.

FIG. 2 shows an Internet packet. Port fields 23, 24 identify which ports were assigned by the network software for communication with a higher-level application requesting a communications session. Destination port field 23 specifies the port on the destination machine, while source port field 24 specifies the port on the source machine. Protocol 26 is a field identifying the network protocol used, such as TCP or UDP. Destination address field 28 contains the IP address that the packet is being sent to, while source address field 29 contains the IP address of the sender of the packet.

The contents or data of the packet, perhaps with additional higher-level headers, is contained in data field 22.

While some applications may use certain ports, many applications use standard ports, such as port 80 for web browsers. Often these ports are dynamically assigned to applications, so that different ports are used by the same application at different times. Simply reading port fields 23, 24 does not uniquely identify applications, so it is difficult to determine priority based on port fields 23, 24. Most applications use the TCP protocol, so protocol field 26 likewise does not uniquely identify users or their applications.

IP address fields 28, 29 often uniquely identify a user or a server machine, and IP-address filtering has been used to restrict access by children to adult-only web sites. IP-address filtering has been less successful for blocking unwanted "junk" or "spam" e-mail, since the IP-address fields are often altered to hide the originating IP address. Larger web sites may use many IP addresses that may dynamically change as the web site is updated. Even client machines can have dynamically-assigned IP addresses rather than a static IP address. Often many users share an IP address. Thus determining packet priority using IP addresses is not effective.

Figure 3:
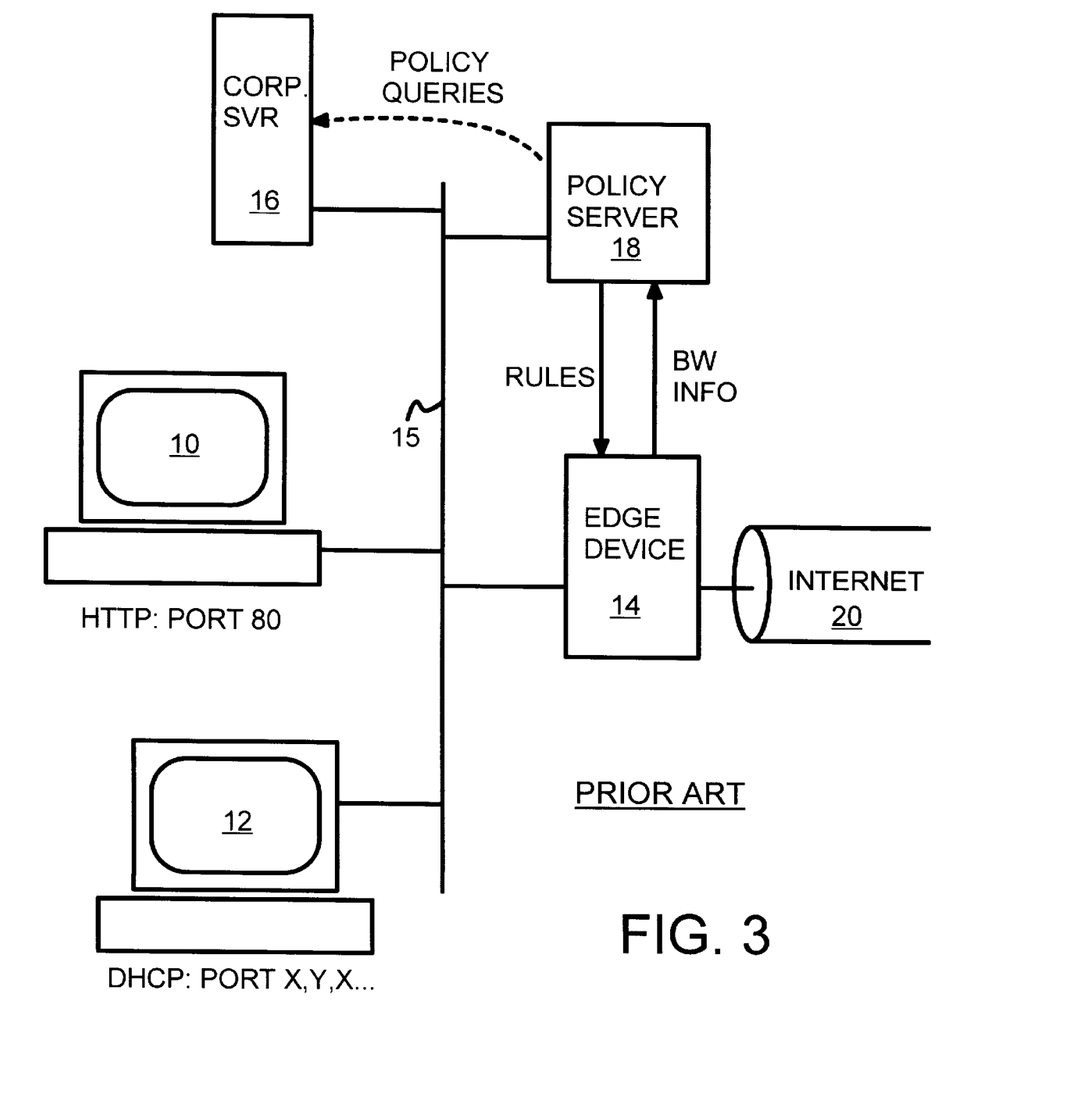
FIG. 3 is a diagram of a network that controls traffic using policy rules.

Policy-Controlled Network—FIG. 3

FIG. 3 is a diagram of a network that controls traffic using policy rules. Client PCs 10, 12 send IP packets over local network 15 to corporate server 16 and Internet 20. Edge device 14 is a router, switch, gateway, modem or other network device that connects local network 15 to Internet 20. Traditionally, routers such as edge device 14 have simply passed all packets through roughly in the order received, without regard to priority.

Edge device 14 is able to block or delay packets to and from Internet 20 so that higher-priority packets experience less delay than lower-priority packets. Edge device 14 examines packets and applies policy rules to determine which packets to accelerate and which to delay.

Policy server 18 sends the policy rules to edge device 14. Bandwidth information is sent back from edge device 14 to policy server 18. This bandwidth information might indicate the current bandwidth available to Internet 20 or local network 15, or other traffic or load statistics such as the kinds of packets appearing. The bandwidth information is used by policy server 18 to re-prioritize packets passing through edge device 14 by adjusting the policy rules sent to edge device 14. For example, when edge device 14 detects video conferencing packets passing through, policy server 18 can reduce the bandwidth allocated to other kinds of packets to reserve additional network bandwidth for video-conferencing packets.

Often higher-priority packets are generated by corporate server 16 than client PCs 10, 12. Policy server 18 can send a policy query to corporate server 16 when certain kinds of packets appear in the bandwidth information from edge device 14. Corporate server 16 can respond that the new kind of packets are high or low priority. Also, corporate server 16 may indicate if an IP address is high or low priority.

While such a policy-controlled network is effective, newer technologies make determining the priority of packets more difficult. Low-priority web browsing from client PC 10 can be identified by the IP address for client PC 10 and port 80 used by the browser. However, newer software installed on client PC 12 dynamically assigns ports to applications. IP addresses may also be changed using Dynamic Host Configuration Protocol (DHCP). The application may appear as port 50 one day, but port 22 on another day. The IP address assigned to client PC 12 may also be dynamically assigned or even shared by other client PCs.

Identifying web browser traffic from client PC 12 is thus quite difficult. Client PC 12 could be downloading huge graphics images from the Hubbell Space Telescope for personal use, swamping the capacity of the network, while client PC 10 waits to read text-based information from an important customer over Internet 20. Network chaos erupts when even a few users hog bandwidth for low-priority tasks.

Figures 4, 5:
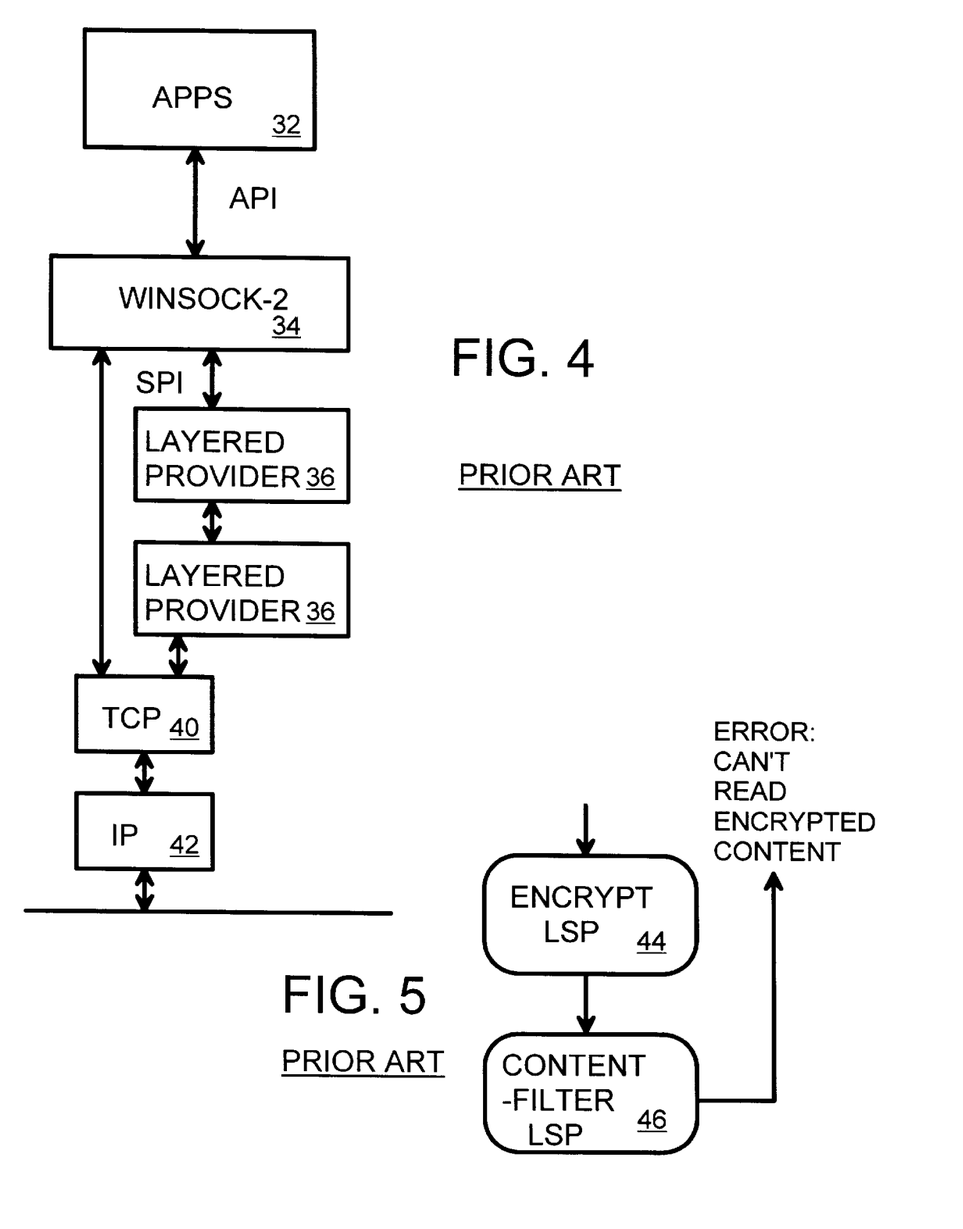
FIG. 4 is a diagram of the Winsock-2 architecture, with layered providers of network services.
FIG. 5 highlights a problem when two or more layered service providers (LSPs) are installed.

Winsock-2 Architecture—FIG. 4

FIG. 4 is a diagram of the Winsock-2 architecture, with layered providers of network services. Winsock-2 is a second-generation network architecture for Microsoft's Windows operating systems that provide sockets for high-level applications to connect to a network.

High-level applications 32 send and receive information to a network by making calls to Winsock-2 library 34. These calls use an applications-programming interface (API) that defines the function calls and their syntax. Winsock-2 34 library is a dynamic-link library (DLL) of these function calls and other network-support routines. Earlier versions of Winsock communicated directly with the lower TCP layer 40, which provides a Transmission Control Protocol for establishing sessions with remote hosts over a network. TCP layer 40 sends data to IP layer 42, which splits the data into Internet-Protocol IP packets and adds header information such as the source and destination IP address. IP layer 42 sends and receives these IP packets to the network media using physical layers such as a media-access controller (MAC).

Winsock-2 specifies a service-provider interface (SPI) from Winsock-2 library 34 to TCP layer 40. While direct communication can occur, Winsock-2 allows third-party software modules known as layered providers 36 to use the SPI to communicate with Winsock-2 library 34 and with TCP layer 40. Layered providers 36 can provide various extra network services such as encryption, compression, security, or re-routing. These network services are transparent to high level applications 32 and can be activated for all applications using the network.

Layered providers 36 perform important functions by intercepting all network traffic at a lower level than the applications. Layered providers fit between Winsock-2 library 34 and TCP layer 40, modifying data sent from Winsock-2 library 34 to TCP layer 40 for transmission. Each layered service provider 36 is a fairly complex software module, requiring ten thousand or more lines of code. Each layered service provider 36 must perform its own filtering of packets, deciding which packets to intercept and modify and which to ignore. When more than one service provider is installed, each must perform its own filtering, possibly slowing communications from the redundant filtering.

No Ordering for Two Or More Layered Service Providers—FIG. 5

FIG. 5 highlights a problem when two or more layered service providers (LSPs) are installed. Encrypt LSP 44 intercepts transmitted packets and performs encryption on the data portion of the packets to prevent unauthorized reading. Content-filtering LSP 46 is a second layered provider that scans the data portion of packets for keywords or text strings.

When encryption LSP 44 is executed before content-filtering LSP 46 is run, the encryption LSP is the first to intercept packets from Winsock-2 library 34 of FIG. 4. Encryption LSP 44 scrambles the textual contents of the data portion and sends the encrypted packet to the next service provider, content-filtering LSP 46. When content-filtering LSP 46 receives the encrypted packet, it is unable to read the contents of the data packet since the contents have been scrambled by encryption LSP 46. Thus content-filtering LSP 46 is unable to perform its task. An error message can be generated and transmission of the packet halted, or content-filtering can be skipped, rendering content-filtering LSP 46 useless.

However, if encryption LSP 44 is executed after content-filtering LSP 46 is run, then content-filtering LSP 46 is first to intercept packets from Winsock-2 library 34. Filtering is performed normally without interference since encryption LSP 44 scrambles the textual contents of the data portion after content-filtering.

No specific ordering of the layered providers is available in the Winsock-2 architecture. While Winsock-2 is useful when only one layered provider is installed, once a second service provider is installed, the results and inter-operability of the two service providers is uncertain. The order of execution is determined by when the user installs each of the service providers, not on the functions performed.

As more vendors write more and more service providers, the interaction among the installed service providers will cause more problems unless vendors check for all other possible service providers and change the installation order for best results. Unfortunately, vendors typically install their software in the highest-priority position, and when failures occur, the other vendors are blamed.

What is desired is a layered network architecture that allows multiple third-party service providers to be installed. It is desired to expand the Winsock-2 architecture for network services provided at a low level. These network services should be able to transparently intercept network traffic. It is further desired to reduce the complexity of layered providers and eliminate redundant filtering by each layered provider. An expandable system that manages, organizes, and orders low-level network service providers is desirable. It is desired to execute layered service providers in a functionally correct order even when many layered service providers from different vendors are installed.

SUMMARY OF THE INVENTION

An extensible service provider is for filtering, sorting, and executing plugin network-service providers. The extensible service provider has an upper interface to a higher-level network-socket library. The higher-level network-socket library provides high-level network functions to high-level user applications by generating a socket for connecting to a remote machine on the network. A lower interface is to a network-transport layer that formats data for transmission over a network.

A plurality of traffic filters each define a predetermined socket state for comparing to a current state of the socket. A plugin manager controls the plugin network-service providers. A filter manager is coupled to a plurality of traffic filters. It controls the traffic filters.

Binding objects are generated at run-time. They bind a plugin network-service provider to a traffic filter. A sorting means is coupled to the binding objects. It sorts the binding objects into an execution order based on functions performed by each plugin network-service provider. An execution means is coupled to the sorting means. It executes the plugin network-service providers in the execution order. The plugin network-service providers operate on the data for transmission over the network. Thus the extensible service provider controls and sorts the plugin network-service providers into the execution order based on functions performed.

In further aspects of the invention, each plugin network-service provider has a functional-class identifier. The functional-class identifier is read by the sorting means. The functional-class identifier indicates when the plugin network-service provider performs:

an examining function that does not modify the data;

a blocking function that blocks the data from being transmitted to the network;

a modifying function that modifies some but not all of the data; and an encrypting function that modifies all of the data.

The plugin network-service providers are sorted into the execution order that executes plugin network-service providers in the order: examining, blocking, modifying, and then encrypting functions, for outgoing data. Thus the data is examined before modified, and modified before encrypted.

In further aspects the execution order is reversed for incoming data. The functional-class identifier further indicates when the plugin network-service provider is a redirector that changes a network protocol or a socket address. Redirector functions are executed before all other functions. Some plugin network-service providers also have ordering hints. The ordering hints indicate when the plugin network-service provider is executed before or after other plugin network-service providers having a same functional-class identifier.

In other aspects the extensible service provider performs filtering and interfaces to the higher-level network-socket library and to network-transport layer. The plugin network-service providers do not directly interface to the higher-level network-socket library and to network-transport layer. Thus the plugin network-service providers are simplified by using the extensible service provider for interfacing and filtering.

In still further aspects a static binding list of traffic filters is attached to each plugin network-service provider. Each socket opened by each high-level application generates a dynamic binding list of the binding objects.

Each traffic filter has a filter-class identifier. The filter-class identifier is read by the sorting means. The filter-class identifier indicates a protocol-level of data being filtered by each traffic filter. The plugin network-service providers are sorted into the execution order according to the filter-class identifier of the traffic filters attached to each plugin network-service provider. Thus attached filters alter the execution order of the plugin network-service providers.

DETAILED DESCRIPTION

The present invention relates to an improvement in low-level network service providers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the current Winsock-2 architecture is potentially dysfunctional when multiple layered service providers are installed. Ordering among layered service providers is crucial for proper execution of some network functions. An extensible framework is needed to manage multiple service providers and execute them in the proper order. Redundant filtering by each service provider can be eliminated if this extensible framework performs filtering for all service providers. Performance can be enhanced when some service providers are not called when filtering determines that they are not necessary.

A single, extensible service provider is installed as the only layered service provider that communicates with the Winsock-2 library and the TCP layer. Other network services are provided by small application modules called plugins that are managed and ordered by the extensible service provider. These plugins are simplified compared with Winsock-2 layered service providers, since overhead for communication with the Winsock-2 library and the TCP layer are handled by the extensible service provider. Since there are many Winsock-2 functions that are not used by most plugins, the overhead for these seldom-used functions is contained in the extensible service provider, reducing the complexity of the plugins.

Coarse filtering is performed for all plugins by the extensible service provider. This filtering determines which plugins should intercept the current network packets and which plugins ignore these current packets. This filtering determines which plugins are needed and which are not. Additional filtering can be provided by the selected plugins. Thus filtering of packets changes the ordering of plugins since non-selected plugins are removed from the current execution order. Performance is improved since unnecessary plugins are skipped.

Figure 6:
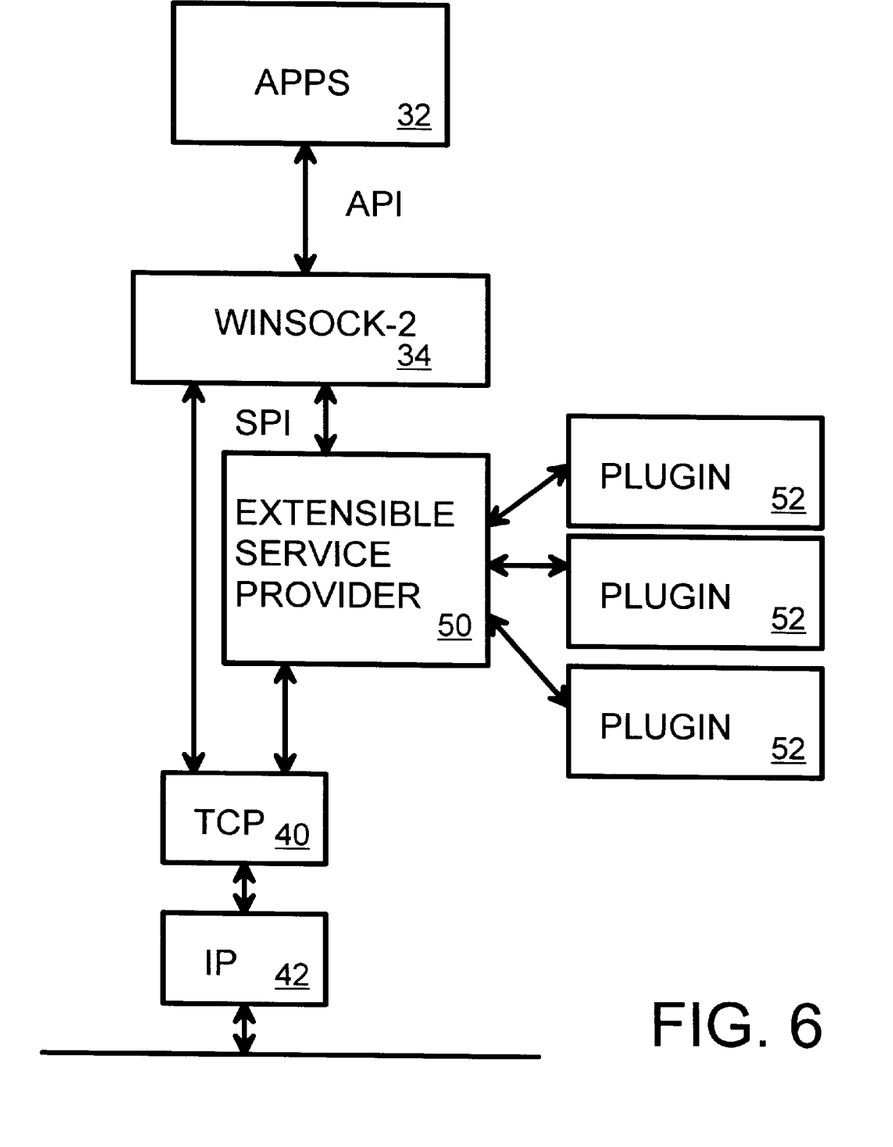
FIG. 6 is a diagram of a network architecture using an extensible service provider that manages and orders network-service plugins.

Extensible Service Provider Accepts Network-Service Plugins—FIG. 6

FIG. 6 is a diagram of a network architecture using an extensible service provider that manages and orders network-service plugins. The architecture is based on Winsock-2, the second-generation network architecture for Microsoft's Windows operating systems. Winsock-2 provides connections or "sockets" for high-level applications to connect to a network. A socket is the identifier for a given connection, or for a connectionless data-gram flow.

High-level applications 32 send and receive information to a network by making calls to Winsock-2 library 34. These calls use an applications-programming interface (API) that defines the function calls and their syntax. Winsock-2 34 library is a dynamic-link library (DLL) of these function calls and other network-support routines.

Earlier versions of Winsock communicated directly with the lower TCP layer 40, which provides a Transmission Control Protocol for establishing sessions with remote hosts over a network. TCP layer 40 sends data to IP layer 42, which splits the data into Internet-Protocol IP packets and adds header information such as the source and destination IP address. IP layer 42 sends and receives these IP packets to the network media using physical layers such as a media-access controller (MAC).

While direct communication from Winsock-2 library 34 to TCP layer 40 can occur, Winsock-2 provides a service-provider interface (SPI) to third-party software modules known as layered providers or layered service providers. Instead of having many layered providers all communicating with TCP layer 40, a single extensible service provider 50 is installed. Extensible service provider 50 intercepts all network traffic at a lower level than the applications. Extensible service provider 50 fits between Winsock-2 library 34 and TCP layer 40, operating on data sent from Winsock-2 library 34 to TCP layer 40 for transmission. Extensible service provider 50 is "extensible" since it allows for the expansion of network services.

Extensible service provider 50 manages or controls the execution of additional network services provided by plugins 52. Plugins 52 are reduced in size and complexity compared with layered service providers because overhead functions and filtering is performed for all plugins by extensible service provider 50.

The exact execution order of plugins 52 is determined by extensible service provider 50. Filtering can change the execution order so that some kinds of packets arrange the plugins in a reverse order. For example, an encryption plugin is executed after a content-filtering plugin for transmitted packets, but the order is reversed for received packets. Reversing the ordering based on the direction of the packets allows the content-filtering plugin to always receive decrypted packets.

Plugins 52 provide various extra network services such as encryption, compression, security, proxies, or re-routing. These network services are transparent to high level applications 32 and can be activated for all applications using the network. Extensible service provider supplies a framework for managing and ordering a wide variety of plugin services.

Figure 7:
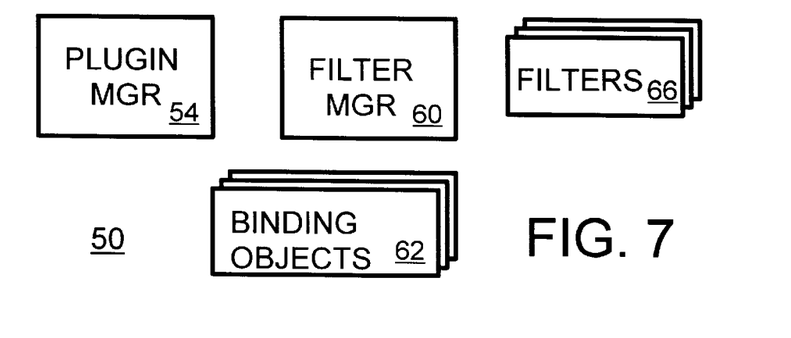
FIG. 7 shows the component modules in the extensible service provider.

Extensible Service Provider—FIG. 7

FIG. 7 shows the run-time objects in the extensible service provider. Extensible service provider 50 has control modules or objects including plugin manager 54 and filter manager 60. Plugin manager 54 manages the plugins, causing them to be executed in the proper order. Filter manager 60 manages one or more installed filters 66. Filters 66 examine network packets and compare them to preset criteria to determine if the packets should be operated on by one or more plugins.

Binding objects 62 specify the binding or coupling between plugins and filters 66. Some of filters 66 activate some of the plugins but not other plugins. Binding objects 62 are created at initialization and are referenced for use when a new socket is opened up or an existing socket is modified by a high-level application using Winsock API calls. Packets of data are then filtered and plugins bound to filters matching the packets are executed.

Figure 8:
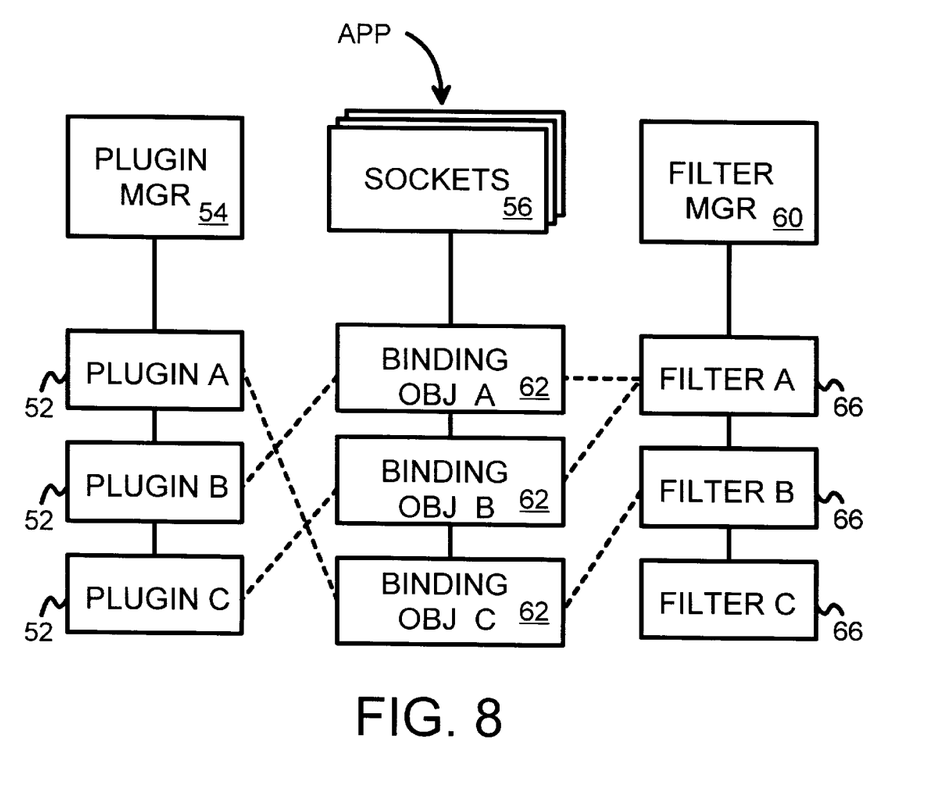
FIG. 8 highlights the binding relationships of plugins to filters by the extensible service provider.

Relationships of Plugins to Filters—FIG. 8

FIG. 8 highlights the binding relationships of plugins to filters by the extensible service provider. When a new plugin is installed, or at startup time, plugin manager 54 finds all plugins 52 listed the Windows registry and loads plugins 52 into memory. The entry point for each plugin 52 is stored by plugin manager 54.

Likewise, all filters 66 listed in the Windows registry are loaded and indexed by filter manager 60, either at startup or when a new filter or plugin is installed. As is shown later with FIG. 13, the Windows registry contains keys for each plugin and each filter, along with parameters that identify locations of and enable or disable plugins and filters, and list which filters are bound to each plugin. This binding in the Windows registry of filters to each plugin is a static binding list. This static binding list does not depend on the connection or socket being opened or used for the packets, and thus is not dynamic.

This static binding list in the Windows registry is further refined to produce a dynamic binding list for a particular socket. The dynamic list is often smaller than the static list, thus reducing the number of plugins that must be executed for a particular socket. Using such a smaller dynamic binding list improves performance.

At initialization, the static binding list is used by the plugin manager to generate binding objects. As a high-level application opens a new connection to a remote server using a new socket, or when the socket is modified, a dynamic binding list that references some of the binding objects is generated or modified. When many applications are operating, several different sockets can be open simultaneously. Each socket 56 has its own dynamic binding list that references binding objects.

Binding objects are run-time objects created to identify which filter is attached to which plugin for the socket. For example, binding object A binds filter A to plugin B. Binding object B binds filter A to plugin C, while binding object C binds filter B to plugin A. Filter C is not used for the socket 56 shown, although it may be used for other sockets. For example, socket 56 may be an outgoing socket, while filter C only selects sockets for incoming packets.

Binding objects 62 are referenced and un-referenced as sockets are opened and closed. Binding objects 62 identify which plugins have met each filter's specification for the current socket. Since the socket specifies the source and destination IP addresses, the port number, protocol, and the direction of the packets, filtering is in effect performed by the creation of binding objects 62 from the static list in the Windows registry. Binding objects 62 all belong to a C++ class.

Since binding objects 62 identify which plugins 52 have bound filters that match the state of the socket, binding objects 62 can be used as a list of plugins to execute. These plugins can then be sorted into execution order using pre-defined criteria. The execution order can further be modified by the filter results.

Figure 9:
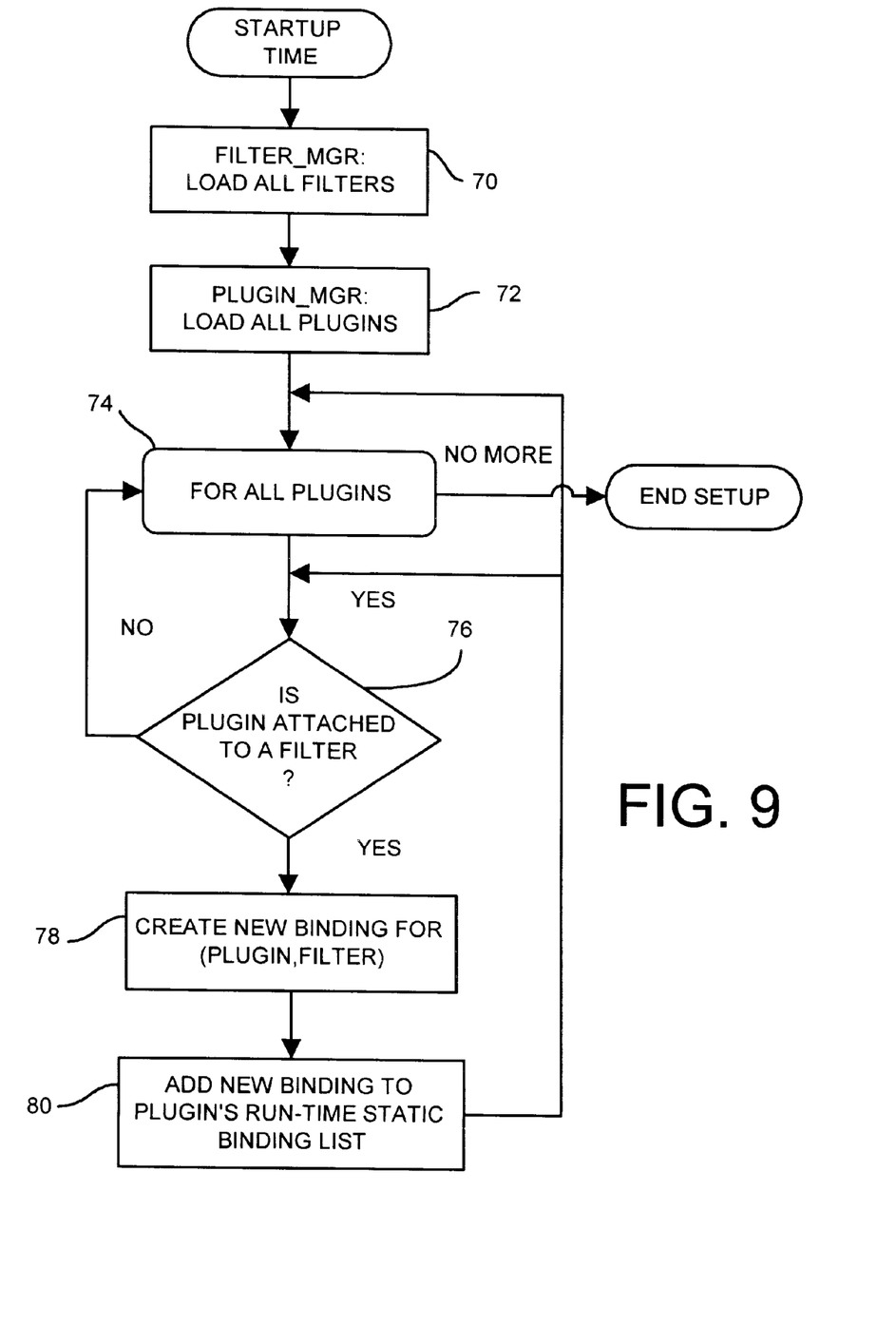
FIG. 9 is a flowchart illustrating how the filter and plugin managers initialize the extensible service provider.

Startup of Filter and Plugins Managers—FIG. 9

FIG. 9 is a flowchart illustrating how the filter and plugin managers initialize the extensible service provider. At startup, such as booting a PC and loading Winsock-2 and network applications, the extensible service provider is also loaded into memory. The filter manager and the plugin manager are loaded into memory and begin execution of initialization routines. The filter manager in step 70 loads all filters into memory by reading the list of filters in the Windows registry. Then in step 72 the plugin manager loads all registered plugins into memory, by reading the plugin key in the registry and the install path parameter for each plugin. The install path points to a dynamic-link library (DLL) containing the plugin.

Once all of the filters and plugins have been loaded into memory, do-loop 74 steps through each registered plugin. Each plugin is tested for any attached filters, step 76. For each filter attached to the plugin, a new binding object is created for the (filter, plugin) pair and stored in memory, step 78. A reference to this binding object is then added to a run-time static binding list in the extensible service provider for the plugin, step 80. The process continues for other filters attached to the plugin, and then for all other registered plugins.

Pseudo-code for this startup process is shown below: process startup time

```
{
   FilterMgr->LoadAllFilters( )
   PluginMgr->LoadAllPlugins( )
   for each plugin
      for each filter attached to plugin
         create Binding( curPlugin, attachedFilter)
         AddBindingToStaticList ( Binding );
}
```

The startup procedure generates the run-time static binding list of filters to plugins from the information in the Windows registry. This static binding list is composed of binding objects.

External setup programs can also update the attached filters under program control, such as for a configuration change. The controller updates the attached filters in the registry, then re-executes the startup routine so that the static binding list is re-generated. Any dynamic (socket) binding lists also need to be updated after such a change.

Figure 10:
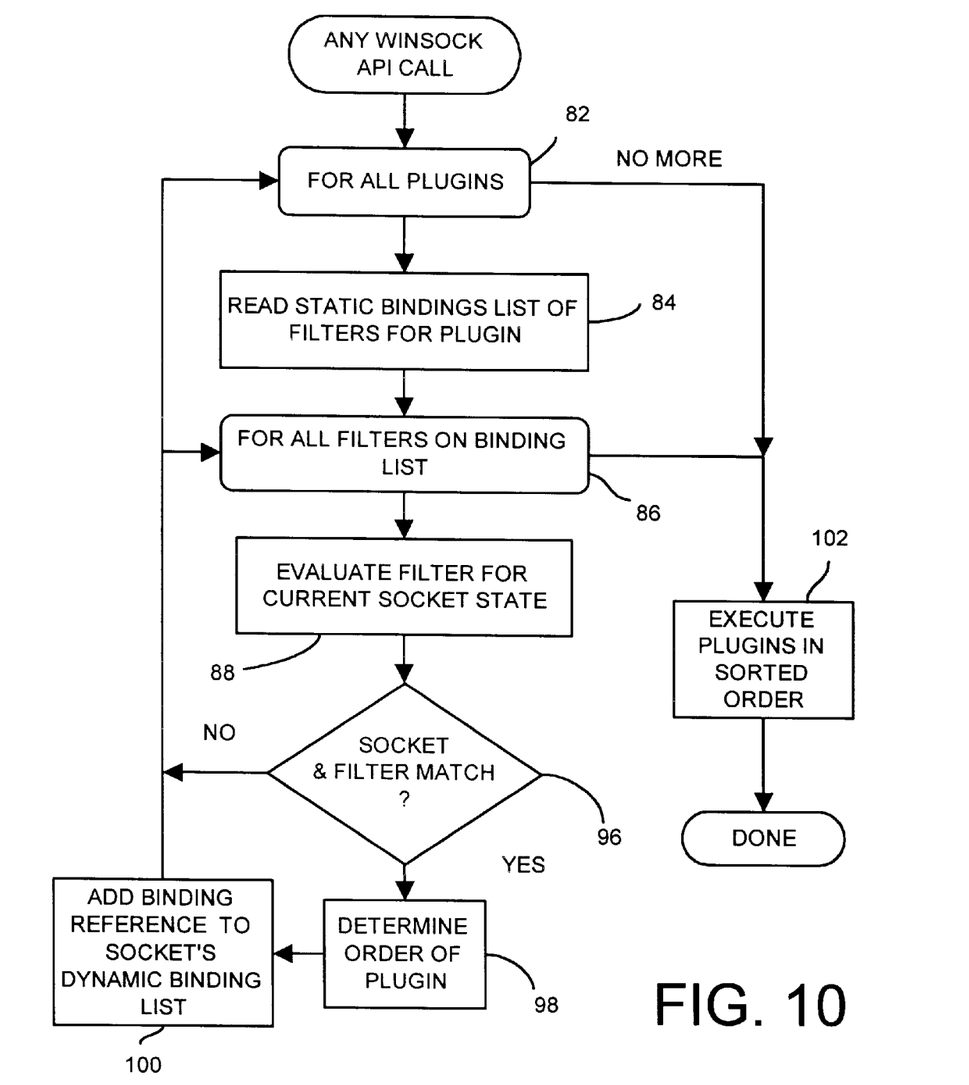
FIG. 10 is a flowchart showing the generation of a dynamic binding list from filters and execution of plugins when any socket operation is called by an application.

Socket Calls Generate Dynamic Binding List—FIG. 10

FIG. 10 is a flowchart showing the generation of a dynamic binding list from evaluation of filters and the execution of plugins when any socket operation is called by an application. When a high-level application makes a Winsock-2 API call to open a new socket, make a connection to a remote machine on the network, or to send or receive packets, or otherwise change the state of a socket, the procedure of FIG. 10 is activated.

Do-loop 82 sequences through each plugin in the Windows registry. The run-time static binding list of filters is read for each plugin, step 84. This is the run-time static binding list that was created at startup as shown in FIG. 9. The static list does not depend on the current state of the socket or the results of a filter on the socket state.

For each filter on the current plugin's static binding list, loop 86, the filter is evaluated for the current state of the socket. For example, the filter may only match outgoing packets to a specific range of IP addresses. Evaluation of the filter is performed by comparing the filtered direction (OUTGOING) and filtered IP addresses to the direction and destination IP address of the socket. If the socket is also for outgoing packets, and these packets have a destination IP address within the filtered range of IP addresses, then the filter matched the current state of the socket. A match is then signaled in step 96.

Matching filters cause the attached plugin to execute. However, execution of the plugin cannot begin immediately, since the order of execution may be incorrect. Instead, the order of execution for the attached plugin is determined, step 98. This order depends on the function performed by the plugin, the attached filter, and also on the current state of the socket. For example, incoming packets may require a different execution order for the plugins that do outgoing packets.

Once the execution order relative to other plugins has been determined, a reference or locator to the binding object is added in step 100 to the socket's binding list. This is the dynamic binding list shown in FIG. 8. It is an ordered list, in execution order of the plugins.

The process is repeated for all filters on the static binding list for the plugin, and also for all other plugins. Filters that are attached to more than one plugin may be evaluated only once for the socket, and their result stored for use by other plugins. Once all filters for all plugins have been evaluated, the dynamic binding list for the socket is complete. The plugins on that list are executed in order, step 102.

Pseudo-code for the procedure of FIG. 10 is shown below: any Winsock API call

```
{
   // update sockets binding list
   for all plugins
      for all Bindings on plugin
         if Binding->Filter->Matches( current socket state )
            // attach binding to socket in correct sorted order
            Socket->AddBindingReferenceToSocket( Binding )
   // dispatch plugin calls
   for all Bindings on Socket
      Binding->Plugin->(appropriate plugin entry point)
}
```

Figure 11:
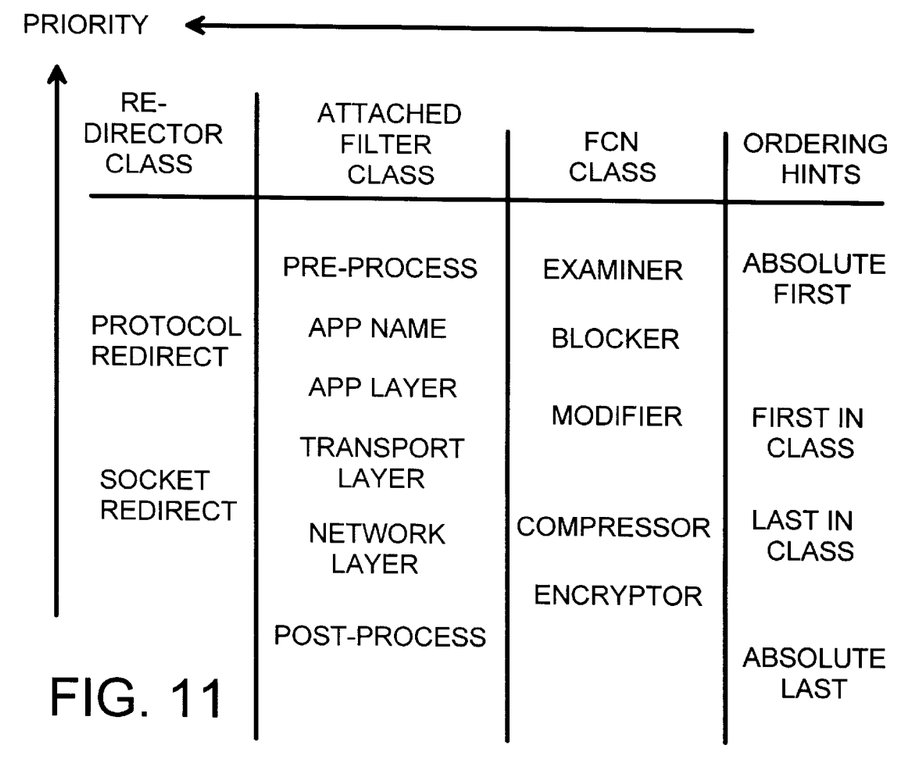
FIG. 11 shows that the function classes of plugins are sorted with the examiner plugins first, the modifying, compressing, and encrypting plugins last.

Ordering of Plugins—FIG. 11

Figure 12:
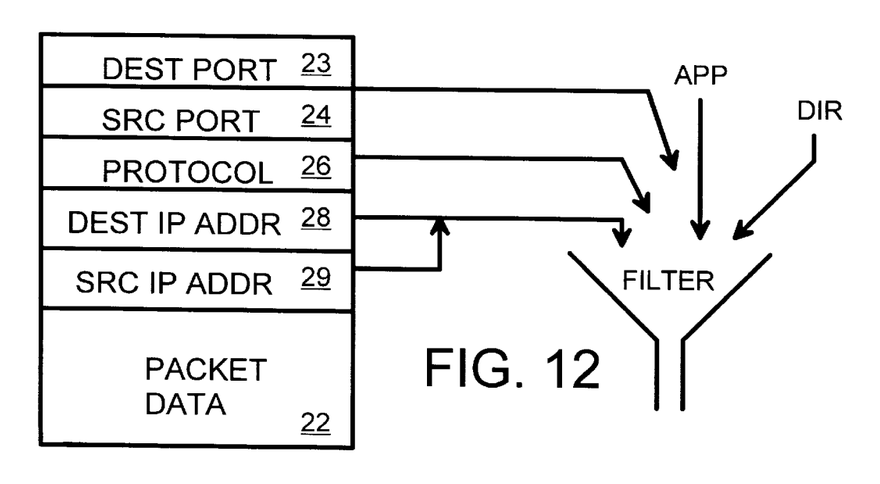
FIG. 12 highlights ordering of plugins by class, function, and predetermined ordering hints.

FIG. 12 highlights ordering of plugins by class, function, attached filter, and predetermined ordering hints. The priority ordering of plugins is shown in FIG. 12 for outgoing packets. The order of plugins is reversed for incoming packets. Priority is based on several parameters associated with each plugin. These parameters are stored in the Windows registry.

The parameters are separated into four groups: redirector class, attached-filter class, function class, and ordering hints. A redirector is a type of plugin that redirects the packets. A plugin that redirects packets by changing the protocol is a protocol redirector, which a plugin that changes the socket address is a socket redirector. For example, the protocol could be changed from UDP to TCP for transmission over TCP-based networks. The IP address may be changed to a pre-defined proxy address so that all network traffic from a particular socket travels to the same destination before being sent to the Internet. Or, a portion of the IP header can be modified to indicate to network infrastructure devices (such as routers) that this application's traffic has higher or lower priority than other traffic.

Since redirection is a major change to a packet, plugins that perform redirection are executed first, before other plugins. Protocol-redirecting plugins are executed ahead of socket-redirecting plugins, as shown in FIG. 11.

Plugins that are not redirectors are then sorted based on the classification of the filter it is bound to. Filters can be defined as pre-process so that their bound plugins are executed first, or post-process for executing after other classes of filters. The filters are classified by the protocol-layer of the information they match for. Filters that search for high-level application names are the highest-ordered filters, followed by application-layer filters that match application-layer protocols such as HTTP or FTP.

Next in execution order are plugins attached to filters for the transport-layer protocol (such as UDP, TCP, ICMP). Then plugins attached to network-layer filters that match the IP or IPX protocols. Finally, the post-process are executed.

Within each filter classification, the plugins are further sorted by the function each filter performs. Plugins that change the packet are executed last while more benign plugins that only examine data are executed first, and thus have higher priority in the sorted list. FIG. 11 shows that the function classes of plugins are sorted with the examiner plugins first, the modifying, compressing, and encrypting plugins last.

An examiner plugin only reads the data in a packet; it does not modify or alter the packet or its header. Thus examiner plugins are executed with a high priority. Next, blocking plugins are executed. Blocking plugins block entire packets by deleting them. For example, outgoing packets could be blocked to reduce network traffic by a plugin that is controlled by a policy server. A content-blocking plugin could block incoming packets with offensive words or from black-listed web sites by deleting packets.

Next to be executed are modifier plugins. Modifier plugins change some of the data in the packet, such as a content-blocking plugin that replaced offensive words with other words or characters such as "@!?$#!". More extensive changes to the packet's data is made by compressor plugins, which perform data compressing, often changing all the data in a packet. Encryption plugins are executed last, since these modify most of the packet. Compressor and encryption plugins can be grouped together as an encoder class.

Ordering hints can optionally be supplied for any plugins. An absolute first hint causes that plugin to be executed before all other plugins, including redirector plugins. An absolute last hint places the plugin at the end of the sorted list, to be executed after all other plugins have executed. The first-in-class and last-in-class hints are useful when two or more plugins are in the same class, such as when two plugins each modify the data.

Filter priority is imposed over the sorting priority as shown in FIG. 11. For example, after the redirector plugins are executed, then all plugins attached to the high-level application filter are executed, after being sorted by function class and ordering hints. Then all plugins attached to transport-layer filters are executed, after being sorted by function class and ordering hints. Plugins attached to network-level filters are executed later.

The invention provides a versatile and powerful ordering scheme. This ordering allows many different kinds of plugins to peacefully coexist. New plugins can be written and added into the system safely, being executed in a logical order based on the function performed.

Filters—FIG. 12

FIG. 12 highlights that filters operate on an application's module name and packet information such as ports, IP addresses. The module-name parameter stored in the Windows registry is the name of the high-level application being filtered for. The extensible service provider allows filters to operate on the module name of the high-level application using the socket, the direction of transfer, the protocol, and IP addresses.

The address family indicates the addressing scheme used, such as for the IP, IPX, SNA, and X,25 protocols. The filter can select a matching network-layer protocol, such as IP or IPX, or a higher transport-layer protocol such as TCP, UDP, ICMP. The high-level application name of the calling process may be filtered, or the application-layer protocol, such as HTTP, SMTP, FTP.

The filters can also be processed in a defined order. For example, do-loop 86 of FIG. 10 can select attached filters in a priority-based order. A parameter indicates what priority the filter has. A filter can be defined as the first (pre-process) or last (post-process) filter evaluated. Filters are processed for higher-level criteria first. Thus application-level names and protocols are filtered first, then transport protocols TCP, UDP, and then network protocols IP, IPX.

Filtering on the packet data 22 is not performed by the extensible service provider's filters. Instead, the plugins must perform such content-filtering. The shared filters in the extensible service provider operates on information that eventually becomes the packet header, such as port fields 23, 24, protocol field 26, destination IP address field 28, and source IP address field 29.

Figure 13:
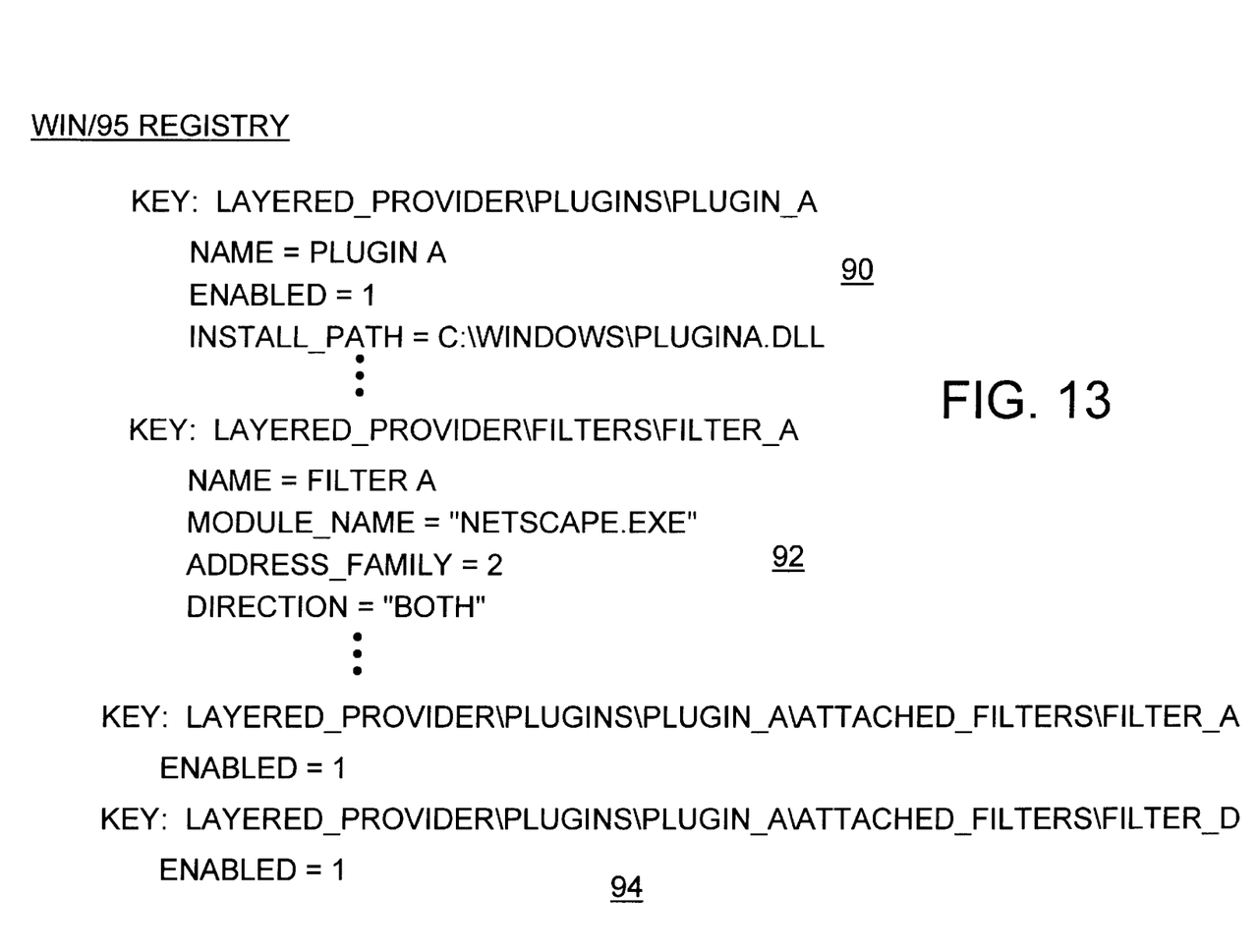
FIG. 13 shows portions of the Windows registry for plugins and filters for the extensible service provider.

Static Bindings in Windows Registry—FIG. 13

FIG. 13 shows portions of the Windows registry for plugins and filters for the extensible service provider. Each plugin has a plugin key 90 in the Windows registry. Plugin key 90 is identified by the name of the plugin, such as PLUGIN_A, and is a sub-key of the layered provider key. The name of the plugin and its installation path on the hard disk are listed as parameters in plugin key 90. An enabled parameter is used to disable the plugin, allowing the plugin to be installed but not running when the system is loaded.

Each filter is defined by a filter key 92, another subkey in the key for the extensible service provider. The filter name and the high-level application or module's filename it is filtering for are listed as parameters. The address family for the filter and the direction of filtering are other parameters. In the example, both incoming and outgoing packets are filtered by FILTER_A.

Binding keys 94 show which filters are attached to each plugin. This forms the static binding list. A key for each filter is placed in an AttachedFiltersubkey of each plugin key. All the filters attached to that plugin have a key in the Attached-Filtersubkey. An enabled parameter is used to temporarily disable a binding of a filter to a plugin. In the example of FIG. 13, FILTER_A is attached or bound to PLUGIN_A, while FILTER_D is also attached to PLUGIN_A.

Figure 14:
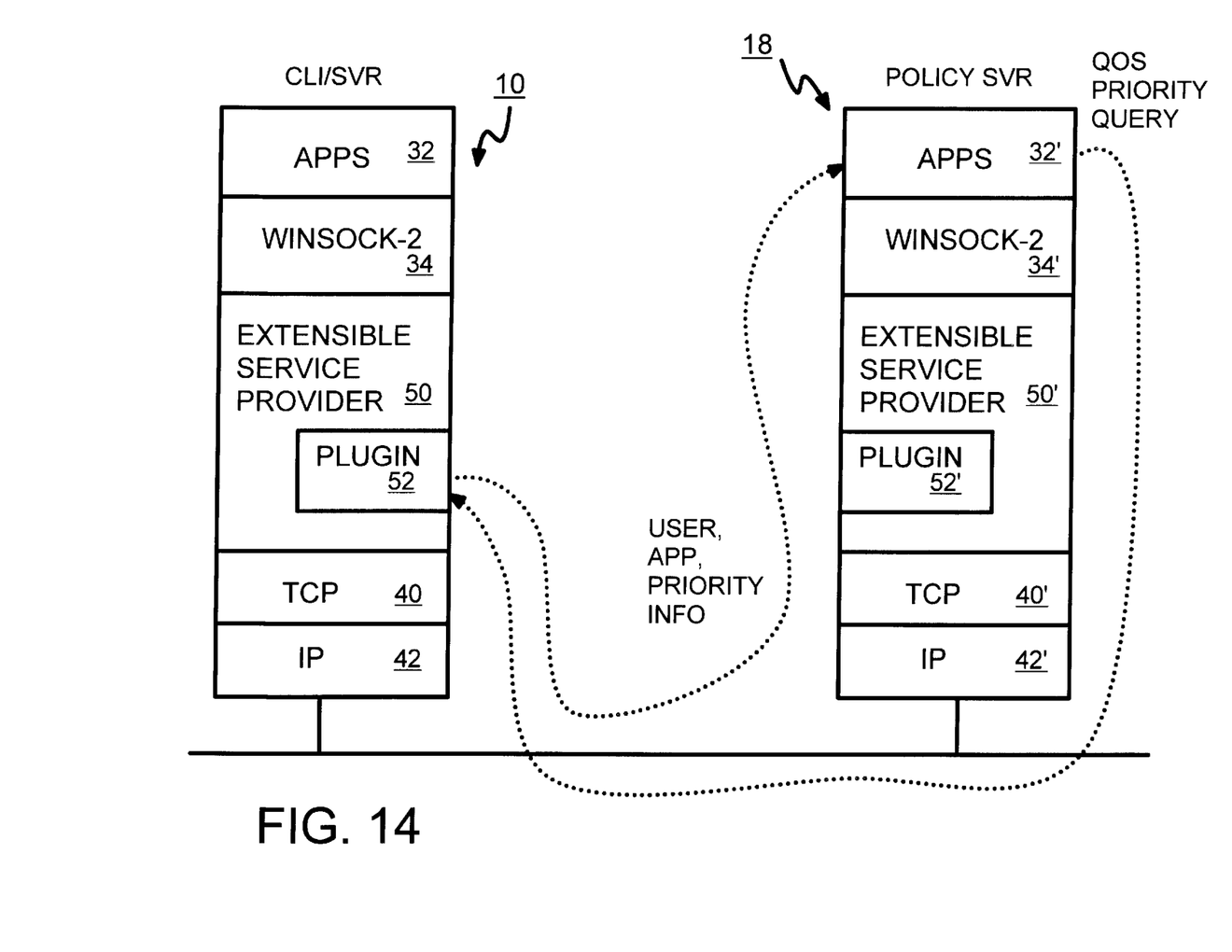
FIG. 14 shows that plugins are useful for providing information for policy control applications in a policy server.

Plugins Useful for Policy Control—FIG. 14

FIG. 14 shows that plugins are useful for providing information for policy control applications in a policy server. Plugins have many intended uses. Plugins can analyze, modify, delete, or even insert network calls. For example, plugins may be used to encrypt all packets for security, to compress packets, to modify packets, or to collect statistics about the packets sent or received. Plugins can periodically send the collected statistics to a server by creating network calls to send packets containing the statistics. Plugins are transparent to higher-level applications since they operate between the Winsock-DLL called by the applications and the lower-level TCP/IP stack.

Policy control is implemented by policy server 18 which collects detailed statistics of network traffic from various network nodes such as client 10. High-level applications 32 in client 10 include www browsers, corporate database viewers and data-entry terminal apps, and workgroup apps such as network-enabled word processors and spreadsheets and other editors. Winsock-2 library receives calls from applications 32 for access to the network. These calls are passed down to extensible service provider 50, which filters these calls and executes one or more plugins 52. Plugins 52 can modify the data sent or even block the data from being sent, or simply analyze the network traffic from client 10.

The Winsock-2 API is provided for use by the plugins. This API is useful for allowing the plugins to communicate with remote servers such as the policy server.

Plugins may themselves make calls to functions in the Winsock-2 DLL library. The call may then be passed down through the extensible service provider and its plugins, allowing the plugin to send additional information over the network. Care must be taken to avoid infinite loops of function calls though.

The analyzed or modified data from plugin 52 is sent back to extensible service provider 50 and sent down through TCP layer 40 and IP layer 42 and finally out over the network.

Policy server 18 may observe some packets from client 10, but does not know what priority to assign to them. A policy application 32 can make a call to Winsock-2 library 34' that is sent through extensible service provider 50', TCP layer 40', and IP layer 42' to client 10 over the network. This call can be directed to plugin 52 in client 10, asking what kind of traffic was recently sent. Plugin 52 can respond by sending a log of packets sent, together with their applications 32 that generated the packets and other high-level information that may not be contained in the packets sent.

Thus policy server 18 is able to query client 10 by using plugin 52, which analyzes and logs network traffic from client 10. More sophisticated schemes could have policy server 18 deciding that the traffic from client 10 is low-priority, and instructing plugin 52 to block traffic from a particular application 32 in client 10. Thus network traffic can be blocked from the source.

Plugins enable policy controls to be implemented in a manner transparent to higher-level applications. Plugins provide a way for network software to more closely examine network traffic from any machine, and even exert control over that machine's traffic.

ADVANTAGES OF THE INVENTION

A layered network architecture with the extensible service provider allows multiple third-party service providers to be installed. The Winsock-2 architecture is expanded for network services provided at a low level. These network services can transparently intercept network traffic. The complexity of layered providers is reduced and redundant filtering by each layered provider is eliminated by using the extensible service provider. An expandable system that manages, organizes, and orders low-level network service providers is attained. Plugins are executed in a functionally correct order even when many layered service provider plugins from different vendors are installed.

The current Winsock-2 architecture is potentially dysfunctional when multiple layered service providers are installed. Ordering among layered service providers is crucial for proper execution of some network functions. An extensible framework is provided by the extensible service provider, which manages multiple service-provider plugins and executes them in the proper order. Redundant filtering by each service provider is eliminated since the extensible framework performs filtering for all plugin service providers. Performance is enhanced since some plugin service providers are not called when filtering determines that they are not necessary.

These plugins are simplified compared with Winsock-2 layered service providers, since overhead for communication with the Winsock-2 library and the TCP layer are handled by the extensible service provider. Since there are many Winsock-2 functions that are not used by most plugins, the overhead for these seldom-used functions is contained in the extensible service provider, reducing the complexity of the plugins.

The invention provides a versatile and powerful ordering scheme. This ordering allows many different kinds of plugins to peacefully coexist. New plugins can be written and added into the system safely, being executed in a logical order based on the function performed. The extensible service provider provides a framework for quickly developing new applications and traffic-sensitive networking functions such as encryption, compression, proxies, content filtering, billing, etc.

Alternate Embodiments

Several other embodiments are contemplated by the inventors. For example, many software implementations using many different programming languages are possible. The invention may be adapted for UNIX and other operating systems, as well as future versions of Windows. Edge devices may also be installed at internal points in a network, such as between sub-nets in a corporate Intranet. Many edge devices can be employed in a single network. Indeed, the invention can be applied to traffic within a local network or within an Intranet.

The extensible service provider has been described as the only installed layered service provider that communicates with the Winsock-2 and TCP layers. However, other layered service providers can be installed that do not operate as plugins to the extensible service provider. These other service providers can cause problems as the prior-art layered-service providers did since their ordering cannot be controlled. Thus it is possible to install traditional Winsock-2 LSP's, but these are subject to the same problems. Only when the LSP's are converted to the plugin format can their ordering be controlled and the ordering problem of FIG. 5 solved. Future improvements to Winsock-2 that define ordering can also be used with the invention. Earlier versions of Winsock communicated with both TCP and UDP, and UDP can be substituted for the TCP layer with the invention.

The invention has been described as filtering packets. However, data may not yet be divided into the final packets transmitted over the network media when intercepted by the extensible service provider. The data sent from the Winsock-2 library functions down to the extensible service provider and the TCP layer may be further divided by the TCP and IP layers into smaller packets for transmission. Thus the term "packets" when used for the extensible service provider do not strictly refer to the final transmitted packets, but to the data and header information that will eventually form one or more packets.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An extensible service provider for filtering, sorting, and executing plugin network-service providers, the extensible service provider comprising:

an upper interface to a higher-level network-socket library, the higher-level network-socket library for providing high-level network functions to high-level user applications by generating a socket for connecting to a remote machine on the network;

a lower interface to a network-transport layer, the network-transport layer for formatting data for transmission over a network;

a plurality of traffic filters each defining a predetermined socket state for comparing to a current state of the socket;

a plugin manager for controlling the plugin network-service providers;

a filter manager, coupled to a plurality of traffic filters, for controlling the traffic filters;

binding objects, generated at run-time, for binding a plugin network-service provider to a traffic filter;

sorting means, coupled to the binding objects, for sorting the binding objects into an execution order based on functions performed by each plugin network-service provider; and execution means, coupled to the sorting means, for executing the plugin network-service providers in the execution order, the plugin network-service providers operating on the data for transmission over the network, whereby the extensible service provider controls and sorts the plugin network-service providers into the execution order based on functions performed.

2. The extensible service provider of claim 1 wherein each plugin network-service provider has a functional-class identifier, the functional-class identifier being read by the sorting means, the functional-class identifier indicating when the plugin network-service provider performs:

an examining function that does not modify the data;

a blocking function that blocks the data from being transmitted to the network;

a modifying function that modifies some but not all of the data; and an encrypting function that modifies all of the data, wherein the plugin network-service providers are sorted into the execution order that executes plugin network-service providers in the order: examining, blocking, modifying, and then encrypting functions, for outgoing data, whereby the data is examined before modified, and modified before encrypted.

3. The extensible service provider of claim 2 wherein the execution order is reversed for incoming data.

4. The extensible service provider of claim 2 wherein the functional-class identifier further indicates when the plugin network-service provider is a redirector that changes a network protocol or a socket address, and wherein redirector functions are executed before all other functions.

5. The extensible service provider of claim 2 wherein some plugin network-service providers also have ordering hints, the ordering hints indicating when the plugin network-service provider is executed before or after other plugin network-service providers having a same functional-class identifier.

6. The extensible service provider of claim 1 wherein the extensible service provider performs filtering and interfaces to the higher-level network-socket library and to network-transport layer, wherein the plugin network-service providers do not directly interface to the higher-level network-socket library and to network-transport layer, whereby the plugin network-service providers are simplified by using the extensible service provider for interfacing and filtering.

7. The extensible service provider of claim 6 wherein the higher-level network-socket library is a Winsock-2 library.

8. The extensible service provider of claim 6 wherein the network-transport layer is a TCP layer that interfaces to a lower IP layer, and wherein the data is formatted into TCP/IP packets.

9. The extensible service provider of claim 1 further comprising:

a static binding list of traffic filters attached to each plugin network-service providers;

a plurality of dynamic binding lists of the binding objects, wherein each socket opened by each high-level application generates a dynamic binding list of the binding objects, wherein each traffic filter has a filter-class identifier, the filter-class identifier being read by the sorting means, the filter-class identifier indicating a protocol-level of data being filtered by each traffic filter;

wherein the plugin network-service providers are sorted into the execution order according to the filter-class identifier of the traffic filters attached to each plugin network-service provider;

whereby attached filters alter the execution order of the plugin network-service providers.

10. A computer-implemented method for executing, in an execution order, a subset of a plurality of plugins, the plugins for performing network services, the method comprising:

calling a socket function for opening or transmitting data through a socket-connection for connecting a high-level application to a remote machine on a network, the socket function being a function in an applications-programming interface (API) used by high-level applications to access the network;

activating an extensible service provider before the data is sent from the socket function to a lower network-transport layer, wherein the data is intercepted by the extensible service provider, the extensible service provider for evaluating filters to determine which plugins need to be executed and for sorting the plugins into the execution order;

the extensible service provider, for each plugin in the plurality of plugins:

selecting a current plugin from a list of the plurality of plugins;

reading a binding list of current filters bound to the current plugin;

determining when a current filter is a matching filter by evaluating each of the current filters using a current state of the socket-connection, each filter in the current filters for comparing predetermined criteria to header information for transmission with the data;

adding the current plugin to an execution list when a matching filter is found for the current filter and the current state of the socket-connection;

sorting the execution list of plugins into the execution order by examining a functional-class for each plugin; and executing each of the plugins on the execution list in the execution order before the data is sent to the network-transport layer;

whereby the plugins having a matching filter are executed in the execution order based on the functional-class of each plugin.

11. The computer-implemented method of claim 10 further comprising:

referencing a binding object for binding the matching filter to the current plugin when the current state of the socket-connection matches the current filter, wherein the execution list is generated from run-time binding objects.

12. The computer-implemented method of claim 10 wherein the header information includes a protocol for network transport, a port identifier, a source and a destination network address, and a direction of transport of the data, whereby the filters select some but not all socket-connections based on the predetermined criteria.

13. The computer-implemented method of claim 12 wherein the lower network-transport layer is a TCP layer and wherein the API is a Windows operating system Winsock API.

14. The computer-implemented method of claim 13 wherein the list of the plurality of plugins and the binding list are stored in a general-purpose registry for a Windows operating system.

15. The computer-implemented method of claim 14 wherein additional plugins are added to the plurality of plugins by adding a locator entry to the general-purpose registry, the locator entry for identifying a storage location for the additional plugins, whereby additional plugins are installed for execution by the extensible service provider, allowing for expansion of network services.

16. The computer-implemented method of claim 15 further comprising:

at initialization, the extensible service provider loading all plugins and all filters bound to plugins into memory by reading the list of the plurality of plugins from the general-purpose registry.

17. The computer-implemented method of claim 10 wherein the network services performed by the plugins are transparent to high-level applications, the plugins performing low-level network services.

18. A computer-program product comprising:

a computer-usable medium having computer-readable program code means embodied therein for ordering execution of low-level network-service provider plugins, the computer-readable program code means in the computer-program product comprising:

socket means for receiving data for transmission over a network, the data from a high-level application that uses a high-level library of socket-functions for sending the data to the socket means;

transport means for sending the data to a lower-level network-transport layer, the lower-level network-transport layer for formatting the data for transmission over the network;

filtering means for comparing transmission information for the data from the socket means to predetermined transmission criteria, for indicating when a socket matches the predetermined transmission criteria;

matching plugin means, coupled to the filtering means, for generating an unsorted list of plugins attached to the predetermined transmission criteria;

sorting means, coupled to the matching plugin means, for reading a function performed on the data by each plugin, and for re-arranging the plugins in the unsorted list into an execution order based on the function performed on the data by each plugin; and execution means, coupled to the sorting means, for activating each plugin in the execution order, each plugin operating on the data before a next plugin in the execution order operates on the data, whereby execution of the low-level network-service provider plugins is ordered by functions performed.

19. The computer-program product of claim 18 wherein the computer-readable program code means further comprises:

a functional-class identifier for each plugin, the functional-class identifier being read by the sorting means, the functional-class identifier indicating when the plugin performs:

an examining function that does not modify the data;

a blocking function that blocks the data from being transmitted to the network;

a modifying function that modifies some but not all of the data; and an encrypting function that modifies all of the data, wherein the plugins are sorted into the execution order that executes the plugins in the order: examining, blocking, modifying, and then encrypting functions, for outgoing data, whereby the data is examined before modified, and modified before encrypted.

20. The computer-program product of claim 19 wherein plugins that perform the blocking function block low-priority data from being transmitted on the network to reduce network traffic, the blocking function under control of a policy server.

21. The computer-program product of claim 20 wherein some plugins perform additional filtering of the data.

22. The computer-program product of claim 21 wherein the lower-level network-transport layer adds a header to the data, the header including a protocol-indicating field, a port-identifying field, a source-address field and a destination-address field.

* * * * *